United States Patent [19]
Ertel et al.

[11] 3,760,059
[45] Sept. 18, 1973

[54] PROCESS FOR THE RECOVERY OF ANTIMONY PENTACHLORIDE FROM CATALYST SOLUTIONS

[75] Inventors: Hartmut Ertel, Hofheim/Taunus; Peter Frisch, Schwalheim, both of Germany

[73] Assignee: Farbwerke Hoechst Aktiengesellschaft vormals Meister Lucius & Bruning, Frankfurt/Main, Germany

[22] Filed: Nov. 16, 1971

[21] Appl. No.: 199,308

[30] Foreign Application Priority Data
Nov. 18, 1970 Germany.................. P 20 56 648.7

[52] U.S. Cl. .................................. 423/87, 423/491
[51] Int. Cl. ............................................. C01b 29/00
[58] Field of Search .......................... 423/491, 87

[56] References Cited
UNITED STATES PATENTS
2,102,737  12/1937  Peck et al. .......................... 423/491
2,786,738  3/1957  Ruh et al. .............................. 423/87

Primary Examiner—Edward Stern
Attorney—Henry W. Koster

[57] ABSTRACT

The invention relates to the recovery of antimony pentachloride from catalyst solutions, which are used for the fluorination of chlorosubstituted methanes or ethanes. The process is based on the reduction of antimony pentachloride, which is dissolved in a used catalyst solution by means of trichloroethylene, at a temperature of from 100°C to 170°C. The crystalline antimony trichloride obtained precipitates from the solution and is separated from all the impurities. The antimony trichloride obtained can be re-oxidized to form antimony pentachloride by any known process.

1 Claim, No Drawings

PROCESS FOR THE RECOVERY OF ANTIMONY PENTACHLORIDE FROM CATALYST SOLUTIONS

The present invention relates to a process for the recovery of antimony pentachloride from catalyst solutions.

Antimony pentachloride serves as catalyst for the reaction of chlorinated hydrocarbons with hydrogen fluoride, in which process one or several chlorine atoms are exchanged for fluorine. According to this method, chloro-fluoro-hydrocarbons are prepared technically.

In the course of the continuous or discontinuous performance of this process, for example, in the case of the preparation of $CHClF_2$ from chloroform or of $CCl_3F$ and/or $CCl_2F_2$ from carbon tetrachloride, organic impurities having an elevated boiling point are accumulated in the liquid catalyst. These impurities are not, or not to a sufficient degree, discharged together with the desired reaction products. This leads to a dilution of the catalyst and reduces its efficiency. Renewal becomes necessary, when its activity has become too low.

The working-up of the used catalyst solutions by distillation would obviously solve the problem but it is rather complicated. The used catalyst solutions contain only an insignificant amount of Sb-F-compounds in the presence of excess carbon tetrachloride or chloroform. During distillation, however, temperatures are required at which the $SbCl_5$ present in the used contact solutions has already a rather high vapour pressure and thermally decomposes to yield chlorine, which is highly corrosive to the steel normally used as material for the reaction vessel. Moreover, some of the impurities have a high melting point, so that there is also the risk of blocking up the distillation apparatus.

The present invention provides a simple process for the recovery of antimony pentachloride from these catalyst solutions, which comprises heating the catalyst solution with trichlorethylene at a temperature of from 100° to 170° C, preferably from 110° to 130° C, in which process all the antimony is virtually converted into antimony trichloride, which is separated in a crystalline form from the organic solution and is then worked up to form antimony pentachloride.

Antimony trichloride may be worked-up, for example, by chlorination with elementary chlorine.

The antimony pentachloride thus obtained can readily be used again for a fluorination process. The separated organic solution, which contains only a small amount of antimony compounds, may either be decomposed as such into its components according to common methods by fractional distillation, or the antimony compounds are separated by washing the organic solution with, for example, hydrochloric acid.

The reaction of the antimony (V) compounds with tri-chlorethylene is generally carried out in a nickel autoclave, under a moderate pressure, as it corresponds to the vapour pressure of the solution at the selected temperature. The used catalyst solution and the trichlorethylene required are combined in the autoclave and are heated to the reaction temperature of from 100° to 170° C, preferably from 110° to 130° C. The reaction time is in the range of from 1.5 to 150 hours, depending on the reaction temperature. Even in the case of an incomplete reduction, at least part of the antimony used can be separated or obtained as antimony trichloride. It is also possible to operate without pressure, if a component increasing the boiling point is added to the reaction solution, for example, perchlorethylene.

The amount of trichlorethylene required per mole of antimony (V) compound is in the range of from 1 to 3 moles, preferably from 1.5 to 2.5 moles. The upper limit is not crucial, as antimony trichloride is only slightly soluble in trichlorethylene. Owing to the low vapour pressure of the dissolved antimony trichloride, the fractional distillation of the separated organic mixture is disturbed only to a very limited extent. The carbon-containing compounds obtained during the fractional distillation contain chlorine and fluorine and are in particular compounds containing 1 or 2 carbon atoms. This fraction can be used in further fluorination processes according to known methods.

The use of other olefins as chlorine acceptors does not have the same result, since they do not, or not only, react by adding chlorine - the less chlorine they contain -, but yield tarry products in side reactions. If perchlorethylene is used as chlorine acceptor, hexachlorethane is obtained, which is moderately soluble in other halogen hydrocarbons and which tends to sublime, and furthermore dissociates partially into perchlorethylene and chlorine at the reaction temperature.

In view of the scarcity of antimony and the tremendous difficulty to recover antimony from waste material, the claimed process represents a significant technical progress.

The following Examples serve to illustrate the invention.

EXAMPLE 1:

1 Liter of used catalyst solution consisting mainly of $SbCl_5$, $CCl_4$, $CCl_3F$ and ethane derivatives containing fluorine and chlorine had a weight of 2.17 kg and contained, according to an analysis, 672 g of Sb, which corresponded to 5.52 gramatoms.

These 2.17 kg of catalyst solution were heated in a nickel autoclave having a capacity of 4 liters, together with 1 liter of trichlorethylene, for 24 hours at a temperature of 120° C, under reflux. Subsequently, the solution was cooled to room temperature.

The $SbCl_3$ precipitates in the form of coarse crystals at the autoclave wall. It was filtered off with suction and was washed three times with 300 milliliters each of $CCl_4$; after having been dried in a desiccator, it had a weight of 1.20 kg. According to an analysis, this product contained 593 g of Sb corresponding to 4.88 gramatoms, i.e. 1,115 g of $SbCl_3$. The product thus contained 93 percent of $SbCl_3$ and was therefore to be considered as technically pure. 88.5 percent of the antimony used were thus recovered.

EXAMPLE 2:

1 Liter of the used catalyst solution as described in Example 1, which contained 5.52 gram-atoms of antimony as antimony halides, was refluxed together with 800 g of trichlorethylene (6.1 moles) and 2 liters of perchlorethylene for 150 hours in a glass recipient. During this process a liquid temperature in the range of from 110° to 120° C was found. When the solution was cooled, the $SbCl_3$ precipitated in the form of colourless crystals. The dark-coloured solution was decanted. The crystalline antimony trichloride had a weight of 1,322 g. It contained 1,203 g of $SbCl_3$, which corresponded to a yield of 95 percent of the antimony used.

What is claimed is:

1. A process for the recovery of antimony pentachloride from catalyst solutions containing pentavalent antimony compounds obtained during the fluorination of chlorine derivatives of methane or ethane, which process comprises: heating said catalyst solutions with at least one mole of trichloroethylene per mol of pentavalent antimony compound, for at least 1.5 hours at a temperature in the range of 100° to 170° C under superatmospheric pressure or by further addition of perchloroethylene under atmospheric pressure; separating the crystalline antimony trichloride precipitated from the organic solution; and converting said antimony trichloride to antimony pentachloride.

* * * * *